Nov. 2, 1965 W. B. STONEBERGER ETAL 3,215,813
DEMAGNETIZATION FOR ARC WELDING
Filed March 27, 1963 2 Sheets-Sheet 1

INVENTORS
W. B. STONEBERGER
E. G. WEBB
BY
ATTY.
AGENT.

Nov. 2, 1965    W. B. STONEBERGER ETAL    3,215,813
DEMAGNETIZATION FOR ARC WELDING
Filed March 27, 1963    2 Sheets-Sheet 2
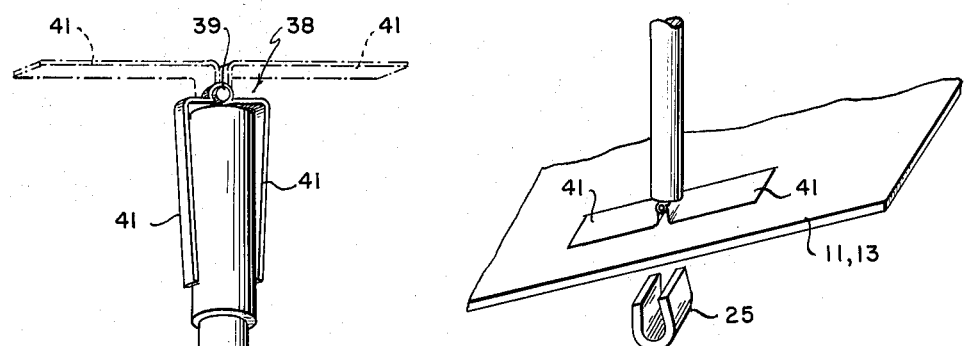
FIG. 4.
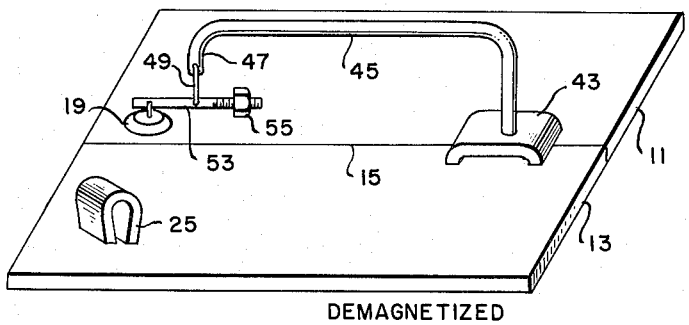
DEMAGNETIZED
FIG. 6.
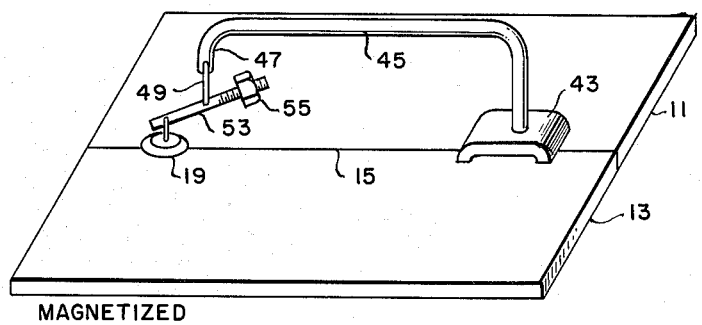
MAGNETIZED
FIG. 3.
FIG. 5.
INVENTORS
W. B. STONEBERGER
E. G. WEBB
BY
ATTY.
AGENT.

United States Patent Office 3,215,813
Patented Nov. 2, 1965

3,215,813
DEMAGNETIZATION FOR ARC WELDING
William B. Stoneberger, 3241 Marne Ave., Norfolk, Va., and Edward G. Webb, 2509 Rodgers St., South Norfolk, Va.
Filed Mar. 27, 1963, Ser. No. 268,505
13 Claims. (Cl. 219—137)
(Granted under Title 35, U.S. Code (1952), sec. 266)

The invention described herein may be manufactured and used by or for the Government of the United States of America for governmental purposes without the payment of any royalties thereon or therefor.

This invention relates to welding and to novel means and methods for demagnetizing material and observably indicating the extent of a demagnetized portion of the material for processing such as arc welding; and more specifically relates to a method of welding highly magnetized steels wherein the extent of a demagnetized joint to be welded is observably indicated prior to welding.

In order to obtain sufficiently high quality arc welds with magnetic metals or highly magnetized materials such as Special Treated Steel (STS), it is necessary to demagnetize or counteract the magnetic field of the STS steel in the region of the weld. By the term demagnetization is meant counteraction of the magnetic field of a magnetic or magnetized material. If the steel is not sufficiently demagnetized, molten metal from the welding rod may spatter away from the welding line. The fusing together of the adjacent edges or surfaces of the steel plates during arc welding should be as uniform as possible. Without sufficient demagnetization, the region of fusion develops faults and discontinuities thus weakening the weld and necessitating rewelding.

Several approaches to the solution of the problem of demagnetizing steel to improve welds have been advanced. In one known prior art arrangement, a compass is used to determine the polarity of a steel plate in the region to be welded. An electromagnet spaced from the intended weld line is energized so that its polarity is opposite to that of the compass needle. In another prior art arrangement, an electromagnet is adjustably controlled to maintain proper demagnetization during welding.

Although some measure of success is attainable by prior art demagnetization arrangements, the present invention affords several important advantages over the prior art not only from the standpoint of minimizing expense and time required, but also from the standpoint of efficiency and accuracy.

Briefly, according to the present invention an arrangement is provided to observably indicate the extent of a demagnetized region of a magnetic or magnetized workpiece at the same time demagnetization is carried out. Thus, before welding is started, the extent of a sufficiently demagnetized portion is already known, and expensive weld condition-adjusting equipment is not required. Moreover by the present invention, the critical factors of field intensity, polarity and location need not be precisely determined. Instead, simple methods and means of demagnetization requiring a minimum of skill, expense and time are afforded by the present invention.

Therefore, it is an object of the present invention to provide a novel method of welding.

Another object of the present invention is to provide an arrangement for demagnetizating magnetic or magnetized material and to provide an observable indication of the extent of the demagnetized portion.

Another object of this invention is the provision of means and methods for observably indicating the extent of demagnetization of a workpiece.

Another object of the present invention is to provide simple means and methods for demagnetizing a workpiece and for indicating the extent of demagnetization sufficient for welding purposes.

Yet another object of the present invention is the provision of novel means and methods for demagnetizing a workpiece.

These and other objects, features and advantages of the present invention will be better understood by referring to the accompanying drawings in which like numerals represent like parts and in which.

FIGS. 3 and 4 taken together, and FIGS. 5 and 6 taken together are views in perspective of alternative embodiments of test elements according to the invention.

Figure 1:
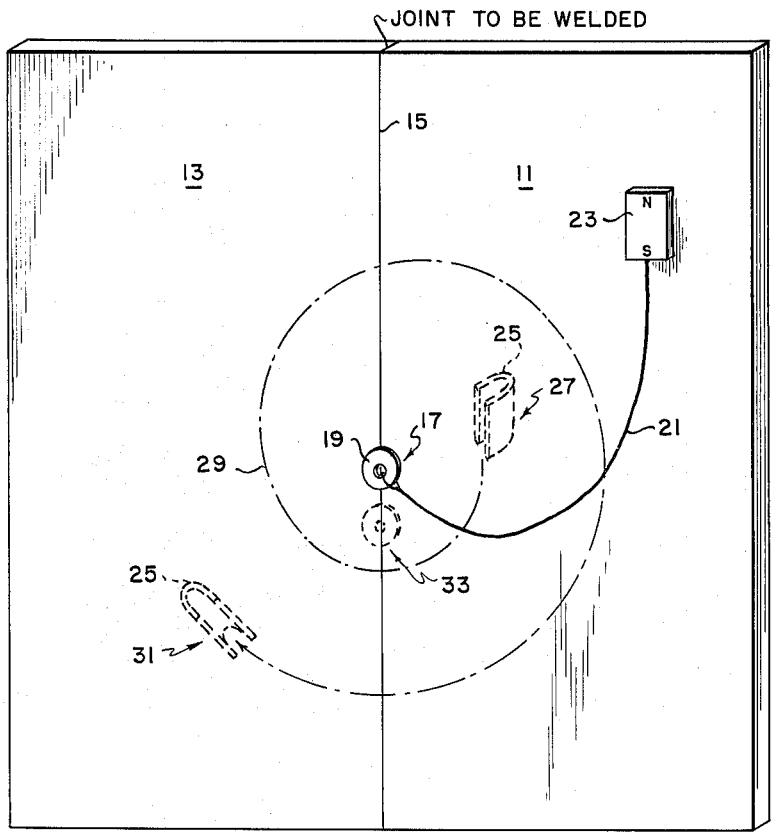
FIG. 1 is a view in perspective of an embodiment of the invention, and modified to illustrate certain principles of the invention.
Figure 2:
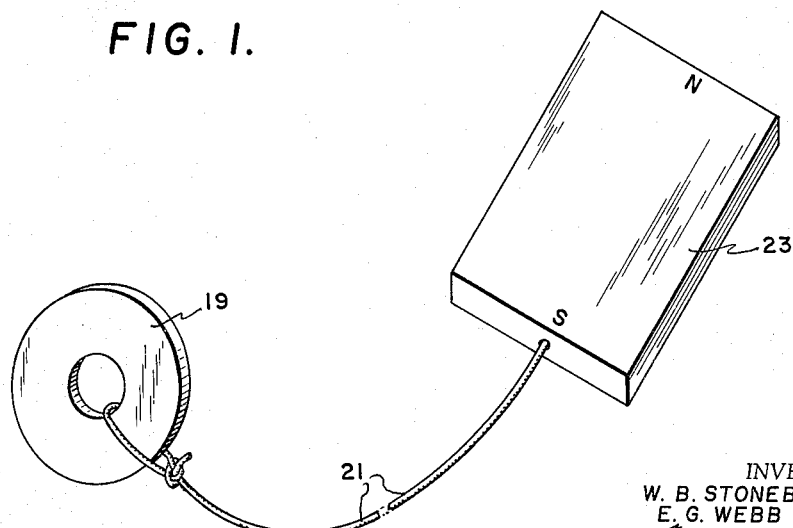
FIG. 2 is a view in perspective of an embodiment of a test element according to the invention.

Referring to FIGS. 1 and 2 of the drawings, a specimen or workpiece 11 of magnetized material such as highly magnetized STS steel is shown for purposes of illustration abutting a similar workpiece 13 along a joint 15 to be welded. A test element 17 made of mild steel and which may be in the form of a centrally apertured thin disc 19 is shown positioned on the weld line or region 15. The test element 17 is magnetically attractable to the workpieces 11 and 13 and is sufficiently light to adhere to the surface of workpieces even when the workpieces are in a vertical position.

However, the retentivity of the test element 17, and the force of magnetic attraction between the test element 17 and the workpieces 11 and 13 is chosen to be sufficiently small so that when the magnetic field of the workpieces is counteracted to provide sufficient demagnetization for welding, the test element 17 is free to move under an external force such as gravity. By way of illustration and not of limitation, the disc 19 may have the size and magnetic properties of a soft drink bottle cap.

The apertured disc 19 is attached to one end of a light string 21. The other end of the string is fastened to an anchoring magnet 23 positioned remotely from the weld region 15. When the disc 19 is free to move, such as in free fall, the anchoring magnet 23 and the string 21 prevents accidental loss of the disc 19.

A powerful U-shaped permanent magnet 25 is shown in a first position 27 in back of the workpieces 11, 13, and spaced laterally from the test element 17. Where the element 17 is of the size of a bottle cap, the magnet 25 may weigh about 3–5 lbs. The permanent magnet 25 is manually moved in a test path 29 of increasing radius about the test element 17, with one pole facing the disc until the test element 17 is observed moving or falling from its position.

If the test element 17 does not fall, the pole positions of the permanent magnet 25 are reversed and the path 29 is retraced until the test element falls. An an added precaution, after the test element 17 is observed to fall, the test element may be replaced and the permanent magnet 25 may be again moved in a test path 29 to further insure that test results are not caused by unknown forces.

When the test element 17 moves, the permanent magnet 25 is thus observed to be in a second position 31. The location of the second position depends upon the characteristics of permanent magnet field strength, the field strength of the work pieces 11, 13; the force of attraction between the test element 17 and the work pieces 11, 13 and the relative pole orientation of the workpieces 11, 13 and the magnet 25. However, these characteristics need not be previously known in order to carry out the demagnetization procedure according to the invention.

The second position 31 of the permanent magnet 25 at which the test element 17 is observed to fall is thus determined by predetermined process of trial and error, that is by moving the magnet 25 in one pole orientation, and if necessary, in an opposite pole orientation, along the essentially spiral path 29. The permanent magnet 25 may be moved about the test element 17 either on the same side or on the opposite side of the workpieces 11, 13. During movement along the test path 29, the permanent magnet 25 may be tilted, with the pole of the same polarity as that of the workpieces at the location of the test element 17 being positioned up and away from the workpiece surface.

After the test element 17 has fallen away due to the counteraction or demagnetization of the workpiece field, the test element 17 is then moved from its original position along the intended weldline 15. During this movement the permanent magnet 25 is kept in its second position 31. When the test element 17 is observed to again adhere to the surface of the workpieces 11, 13, for example, at the position 33 indicated in dashed lines, the extent of the demagnetized portion of the weldline or region 15 is thus determined. The portion of the workpieces 11, 13 which is sufficiently demagnetized for welding therefore extends between the original position of the test element 17 and its second position indicated at 33. Suitable means for welding such as a pair of welding electrodes (not shown) may then be placed in position at the demagnetized portion of the joint 15 for welding the joint.

Of course, the foregoing procedure is repeated for the entire length of the intended weld line or region until the joint 15 is finally welded.

In FIGS. 3 and 4, which illustrate another embodiment of a test element according to the invention, there is shown a test element in the form of a light, pencil-shaped holder 35 having a pocket clip 37. At the working end of the holder 35 is secured in any suitable manner a pair of opposing mild steel leaves 38. The leaves 38 are shown hingeably mounted on a pin 39 rigidly secured in the holder 35. The opposing leaves 38 may be swung into dotted line positions 41 for use as a test element, as shown in FIG. 4, in a manner similar to that described in conjunction with the disc element 19.

In yet another embodiment of a test element illustrated in FIGS. 5 and 6, a permanent magnet mounting block 43 has fitted thereto one vertical end of a horizontally overhanging support arm 45. The other end of the support arm 45 has a downwardly extending portion 47. The lower end of the portion 47 has a hole bored therethrough for receiving a depending string or wire 49. The lower end of the string or wire 49 is passed through the balance point of a balance lever 53 so that the lever 53 is supported for free movement about its equilibrium or balance point.

The balance lever 53 is in the form of a rod threaded at one end for receiving a balance adjusting nut 55. At the other end of the balance lever 53 is freely hung the test element 17 which may be of the same material and construction as the disc 19.

As shown in FIG. 5, prior to demagnetization of the workpieces 11, 13, the disc 19 is magnetically attracted to the workpieces, and the balance lever 53 is out of balance. When the permanent magnet 25 is positioned in the manner described in conjunction with FIG. 1 to counteract or demagnetize the magnetic field of the workpieces 11, 13, the disc 19 is free to be raised, as shown in FIG. 6, by virtue of the return of the balance lever 53 to an equilibrium position. The arrangement of FIGS. 5 and 6 is particularly advantageous when the workpieces 11, 13 are horizontally oriented.

Of course, it is understood that the welding of the joint 15 may be carried out in any suitable manner. In the case of highly magnetized STS steels (armor plate), arc welding is the usual means employed. In carrying out the welding, the demagnetized portions may be marked as they are determined, as by chalk, crayon, etc.

Obviously, configuration of the portion to be welded is not limited to a straight line joint or butt weld line 15 as shown in the drawings for purposes of illustration only. The novel method and means for the present invention may be applied to practically any configuration of weld lines, joints, or regions, and to practically any shape of workpieces or specimens.

It is further understood that the means and methods of this invention may be applied to underwater welding. In the underwater environment the test element may be formed of buoyant material having outer surfaces of magnetically attractable material so that when a workpiece is demagnetized in the manner taught herein, the test element will rise due to its buoyancy instead of falling under gravitational forces.

Obviously many modifications and variations of the present invention are possible in the light of the above teachings. It is therefore to be understood that within the scope of the appended claims the invention may be practiced otherwise than as specifically described.

What is claimed is:

1. The method of welding highly magnetized steel workpieces comprising the steps of:
    positioning a magnetically attractable test element on the surface of said steel workpieces to be welded;
    said test element being subject to external forces other than magnetic whereby when the magnetism of said specimen is sufficiently counteracted, said test element is free to move;
    manually tracing with a permanent magnet, with one pole facing said test element, a path in the vicinity of said test element and of increasing distance from said test element until at a position of said permanent magnet said test element is no longer attracted to said steel workpieces and moves from its original position;
    manually moving said test element along the intended weld line while said permanent magnet remains in said position until said test element is again magnetically attracted to the steel workpieces;
    there thus being defined between the two positions of said test element a region sufficiently demagnetized for welding; and
    welding the steel workpieces in said demagnetized region.

2. The method of demagnetizing a specimen of magnetized material for the purpose of preparing said material for a strong weld comprising the steps of:
    positioning a test element magnetically attractable to said magnetized material on the surface to be welded; and
    manually moving a magnet in a test path around said test element until said test element is no longer attracted to said magnetized material and moves from its original position.

3. The method as defined according to claim 2 but further characterized by said path being one of essentially increasing and decreasing radius around said test element.

4. The method of demagnetizing a specimen of magnetized material for the purpose of preparing said material for a strong weld comprising the steps of:
    positioning a test element magnetically attractable to said magnetized material on the surface to be welded;
    tracing with a magnet a test path of increasingly large radius around said test element until said test element is no longer attracted to said magnetized material at a test position of said magnet and moves from its original position.

5. The method as defined according to claim 4 but further characterized by the steps of:
    replacing said test element in its original position;
    moving said test element from its original position while said magnet is maintained in its test position until the test element is again attracted to said magnetized material;

whereby a portion of said material is sufficiently demagnetized for welding; and welding said demagnetized portion of said material.

6. The method of sufficiently demagnetizing a specimen of magnetic material for preparing said material for a strong weld comprising the steps of:

positioning a test element magnetically attractable to said magnetized material on the surface of said material;

tracing with a permanent magnet with one pole facing said test element a path in the vicinity of said test element and of increasing distance from said test element until at a position of said magnet said test element is no longer magnetically attracted to said material and moves from its original position;

replacing said test element in its original position whereby the test element is yet unfortuitously attracted to the magnetized material;

retracing said path with said permanent magnet with its pole reversed, until said test element is no longer attracted to said magnetic material.

7. The method as defined according to claim 6 but further characterized by the step of:

replacing said test element in its original position;

moving said test element from its original position while said magnet is maintained in its test position until the test element is again attracted to said material.

8. Apparatus for demagnetizing a specimen of magnetic material having a magnetic field for preparing said material for a strong weld at a portion of said magnetic material, said apparatus comprising:

permanent magnet means having sufficient magnetism to counteract the magnetic field of said material specimen for demagnetizing (the magnetic field of) said material at the portion of said material to be welded; and magnetically attractable test element means for indicating the extent of demagnetization of said magnetic material sufficient for welding purposes;

whereby said test element means will be attracted to said magnetic material before demagnetization and will not be attracted to said magnetic material after demagnetization.

9. Apparatus as defined according to claim 8 but further characterized by said test element comprising a thin, magnetically attractable disc.

10. Apparatus as defined according to claim 8 but further characterized by said test element comprising:

a thin, magnetically attractable disc; and means for anchoring said disc to said specimen material to prevent accidental loss of said disc when said disc becomes freely movable.

11. Apparatus as defined according to claim 10 but further characterized by said anchoring means comprising:

a small magnet mounted on said specimen material remotely from said disc; and a length of string connecting said disc to said magnet.

12. Apparatus as defined according to claim 8 but further characterized by said test element comprising:

an arm overhanging said material and anchored thereto at one end;

a balance lever depending from the other end of said arm;

one end of said balance having freely mounted thereon a magnetically attractable disc;

said disc normally adhering to said specimen material whereby said balance lever is displaced from a position of equilibrium.

13. Apparatus as defined according to claim 8 but further characterized by said test element comprising:

a pencil-shaped member; and an opposing pair of outwardly spreadable magnetically attractable leaves mounted at one end of said pencil-shaped member.

References Cited by the Examiner
UNITED STATES PATENTS 2,733,329   1/56   Esposito _____ 219—137

RICHARD M. WOOD, *Primary Examiner.*